US007542616B2

(12) United States Patent
Hatanaka et al.

(10) Patent No.: US 7,542,616 B2
(45) Date of Patent: Jun. 2, 2009

(54) APPARATUS AND METHOD FOR COMPRESSING IMAGE DATA

(75) Inventors: Masahiko Hatanaka, Osaka (JP);
Hisayoshi Zenke, Hyogo (JP); Shusuke Miyaji, Osaka (JP)

(73) Assignee: Panasonic Corporation, Osaka (JP)

( * ) Notice: Subject to any disclaimer, the term of this patent is extended or adjusted under 35 U.S.C. 154(b) by 871 days.

(21) Appl. No.: 10/721,389

(22) Filed: Nov. 25, 2003

(65) Prior Publication Data

US 2004/0146215 A1    Jul. 29, 2004

(30) Foreign Application Priority Data

Nov. 26, 2002    (JP)    ............................. 2002-342000

(51) Int. Cl.
    *G06K 9/36*    (2006.01)
(52) U.S. Cl. ...................................... 382/246; 382/239
(58) Field of Classification Search ......... 382/232–239, 382/244, 246; 348/397.1, 407.1, 620; 375/240, 375/240.1; 358/1.15
    See application file for complete search history.

(56) References Cited

U.S. PATENT DOCUMENTS 5,608,654 A * 3/1997 Matsunoshita .............. 358/1.15
6,668,089 B1 12/2003 Bracamonte et al.

FOREIGN PATENT DOCUMENTS

| CN | 1280745 A | 1/2001 |
| JP | 10-66004 A | 3/1998 |
| JP | 10-066004 A | 3/1998 |
| JP | 10-150633 A | 6/1998 |
| JP | 2000-114980 A | 4/2000 |

OTHER PUBLICATIONS

Bruna Arcangelo et al., "A Very Fast Algorithm For The JPEG Compression Factor Control", Proceedings of the SPIE—the International Society for Optical Engineering, vol. 4669, pp. 297-303, Jan. 23, 2002, Bellingham, VA, US.
European Search Report for EP 03027343, Pub. Oct. 2, 2008.

* cited by examiner

*Primary Examiner*—Duy M Dang
(74) *Attorney, Agent, or Firm*—RatnerPrestia

(57) ABSTRACT

An image data compressing apparatus includes an image data compressor for compressing image data input thereto at first and second compression rates to produce first and second compressed data, respectively, an approximate-expression selector having an approximate-expression table including approximate expressions corresponding to sample data sizes, respectively, and a compression rate determining unit for determining the second compression rate. The approximate-expression selector selects an approximate expression from the approximate expressions. The first approximate expression corresponds to a first sample data size nearest a data size of the first compressed data among the sample data sizes. Each of the approximate expressions indicates a change of a data size in response to a compression rate. The compression rate determining unit determines the second compression rate based on the selected approximate expression. The image data compressing apparatus provides a desired size of the compressed image data by maximum two of the compressing operations.

15 Claims, 6 Drawing Sheets

FIG. 4

(Approximate Size)=$aX^4-bX^3+cX^2+dX+e$  ($1 \leq X \leq 95$)

| i+1 | Sample Size (Byte) | a | b | c | d | e |
|---|---|---|---|---|---|---|
| 1 | 58325 | 9 | 864 | 10548 | 293 | 8394 |
| 2 | 75066 | 12 | 1310 | 23578 | 375 | 9072 |
| 3 | 88933 | 13 | 1265 | 11843 | 456 | 9130 |
| 4 | 103090 | 16 | 1608 | 21809 | 466 | 9201 |
| 5 | 116127 | 25 | 2987 | 96563 | 367 | 9714 |
| 6 | 129237 | 23 | 2565 | 59785 | 521 | 9123 |
| 7 | 144802 | 22 | 2259 | 41135 | 615 | 9353 |
| 8 | 145435 | 27 | 2769 | 40748 | 832 | 6543 |
| 9 | 184334 | 41 | 4712 | 137770 | 648 | 8717 |
| 10 | 200152 | 45 | 5168 | 152700 | 698 | 8748 |
| 11 | 212177 | 49 | 5805 | 186420 | 672 | 8717 |
| 12 | 227955 | 54 | 6491 | 218680 | 695 | 8459 |
| 13 | 248166 | 61 | 7401 | 252250 | 756 | 8417 |
| 14 | 269548 | 68 | 8244 | 274330 | 868 | 8253 |
| 15 | 292248 | 73 | 8621 | 274050 | 1025 | 8557 |
| 16 | 310010 | 77 | 9029 | 277910 | 1150 | 8909 |

APPARATUS AND METHOD FOR COMPRESSING IMAGE DATA

FIELD OF THE INVENTION

The present invention relates to an apparatus and method for compressing image data.

BACKGROUND OF THE INVENTION

An imaging apparatus, such as a digital still camera, which digitizes and compresses an image signal as image data obtained by capturing an image and stores the image data in a semiconductor memory has been put in the market.

The image data is produced from various still images including an image having a luminance signal with a lot of edges, i.e., having a fine texture, and an image having a luminance signal with a few edges, i.e., having a simple texture. The image data is compressed at a constant rate and recorded as an image file in a recording medium, such as a semiconductor memory card having a flash memory or a non-volatile memory. The image files may not have the same file sizes. An image having a lot of edges creates an image file having a large file size. The image files stored in a recording medium have their file sizes different from each other.

If a recording medium having a predetermined capacity stores the image files having various file sizes, the number of images stored in the medium varies, and the number of images storable in the medium cannot be controlled accurately.

As a method for managing the image files easily, the file size of an image file of a still image may be fixed. Such conventional image data compressing apparatus for making the file size fixed is disclosed in Japanese Patent Laid-Open Publication No.10-66004.

FIG. 5 is a block diagram of the conventional image data compressing apparatus. An image data compressor 51 performs a first image data compressing operation for compressing image data of a sample area in a still image and a second image data compressing operation of compressing data of the entire area of the still image. A file-size-evaluating unit 52 calculates an evaluation value from a file size of first image data provided through the first image data compressing operation of the image data compressor 51. According to the evaluation value, a compression-rate determining unit 53 determines a compression rate for the second image data compressing operation. A memory unit 54 includes a first memory 54A for temporarily storing the data of the input still image and a second memory 54B for storing second image data file provided through the second image data compressing operation. A recording medium 55, such as a memory card, stores the second image data file provided through the second image data compressing operation.

FIG. 6 is a flowchart of a routine for estimating the file size in the conventional image data compressing apparatus. Image data of a block consisting of for predetermined pixels of an input image is sampled (Step S60), and then, luminance data of the block of the four pixels are generated (Step S61). The luminance data are subjected to a discrete cosine transform (DCT) process (Step S62). A Huffman table is initialized (Step S63), and the compression rate (Q factor) is set to "95" (Step S64). The luminance data subjected to the DCT process is quantized (Step S65), and is Huffman-encoded (Step S66). It is then examined whether or not a predetermined number (e.g. seventy) of blocks are subjected to operations of Steps S60 to S66 (Step S67). If not, the operations of Steps S60 to S66 are repeated. When the above processes are completed at Step S67, an evaluation value H is calculated (Step S68) and is used for determining the Q factor to compress the entire data of the input image (Step S69).

A portion of the image data stored in the first memory 54A is compressed through the first compressing operation of the image data compressor 51, and the compressed data is stored in the second memory 54B. In the first image data compressing operation, at Step S60 of FIG. 6, the image data compressor 51 compresses the seventy blocks each having four pixels of the input image. The compression rate here, a first Q factor, is fixed to "95" set at Step S64.

Then, the file-size-evaluating unit 52 estimates the size of data obtained by compressing the entire data of the input image from the evaluation value H. The compression-rate-determining unit 53 then determines the compression rate, a second Q factor, for the second data compressing operation. Then, the image data compressor 51 performs the second image data compressing operation of compressing the image data stored in the first memory at the second Q factor. The compressed image data is stored in the second memory 54B and the recording medium 55, such as a memory card, according to requirement.

The data size of the compressed image data of the entire image is estimated based on to a ratio of areas according to the data size provided through the first data compressing operation. The data size after the compressing operation changes in response to the Q factor. In the estimation of the data size, an inclination of the change of the data size varies depending on a texture of the image. Therefore, the estimation of the data size based on the ratio of the areas may be significantly different from the actual compressed data size. In this case, a third data compressing operation is performed for further decreasing the data size. In addition, the blocks selected for the first data compressing operation may not represent an average of the luminance of the entire image. In either case, three of compressing operations is needed. This operations increases the duration of the process for recording the image data in the recording medium 55, thus consuming more electric power.

SUMMARY OF THE INVENTION

An image data compressing apparatus includes an image data compressor for compressing image data input thereto at first and second compression rates to produce first and second compressed data, respectively, an approximate-expression selector having an approximate-expression table including approximate expressions corresponding to sample data sizes, respectively, and a compression rate determining unit for determining the second compression rate. The approximate-formula selector selects an approximate formula from the approximate formulas. The first approximate formula corresponds to a first sample data size nearest a data size of the first compressed data among the sample data sizes. Each of the approximate formulas indicates a change of a data size in response to a compression rate. The compression rate determining unit determines the second compression rate based on the selected approximate expression.

The image data compressing apparatus provides a desired size of the compressed image data by maximum two of the compressing operations.

BRIEF DESCRIPTION OF THE DRAWINGS

FIG. 4 is an approximate-expression table provided in the image data compressing apparatus according to the embodiment.

DESCRIPTION OF THE PREFERRED EMBODIMENT

Figure 1:
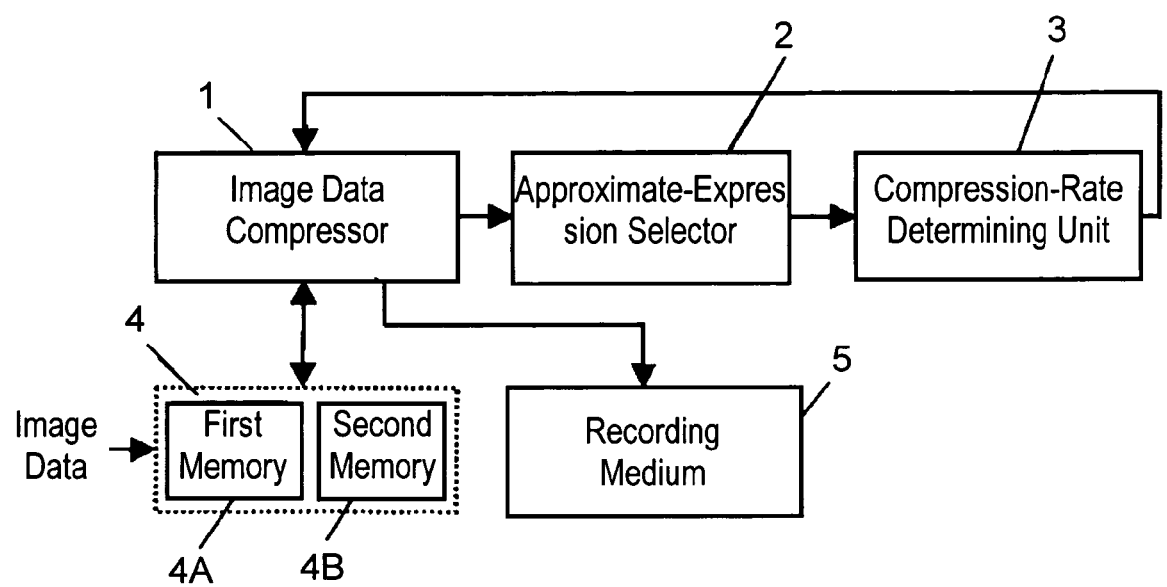
FIG. 1 is a block diagram of an image data compressing apparatus according to an exemplary embodiment of the present invention.
Figure 5:
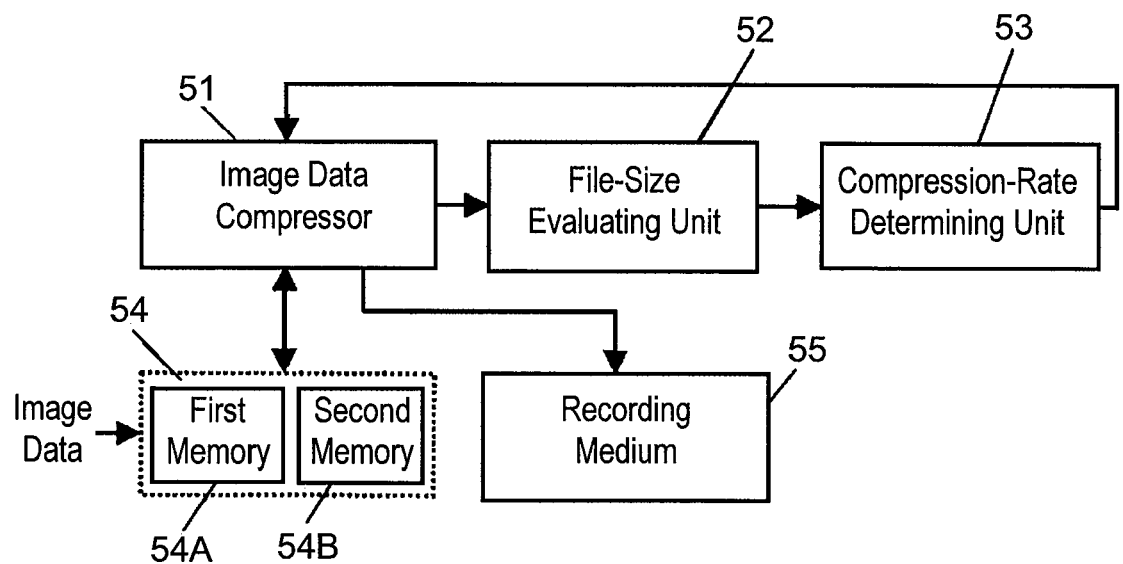
FIG. 5 is a block diagram of a conventional image data compressing apparatus.
Figure 6:
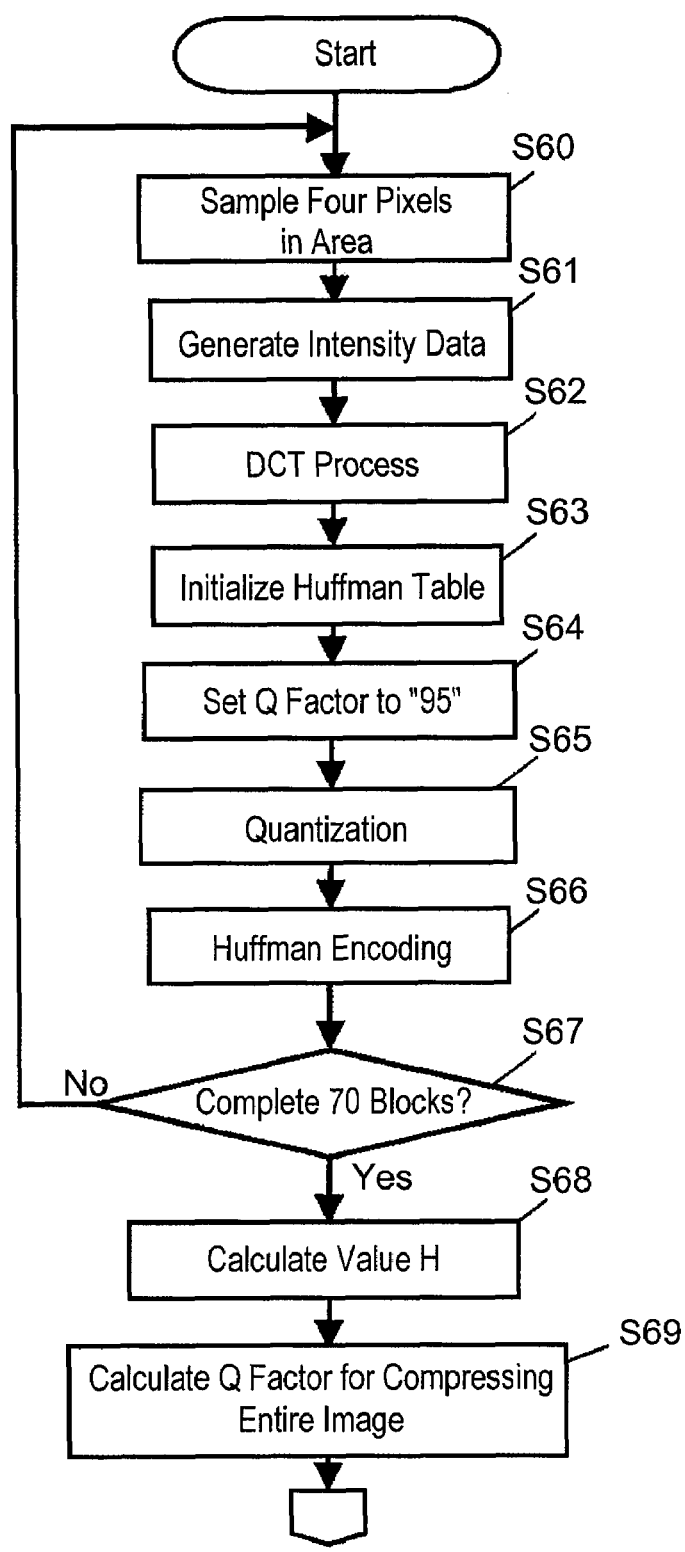
FIG. 6 is a flowchart of a routine of file size estimation in the conventional data compressing apparatus.

FIG. 1 is a block diagram of an image data compressing apparatus according to an exemplary embodiment of the present invention. Image data of a still image input is stored in a first memory 4A. The image data stored in the first memory 4A is compressed by an image data compressor 1, and the compressed data is stored in a second memory 4B and a recording medium 5. An approximate-expression selector 2 compares a data size of the compressed image data provided by the image data compressor 1 with each of sample data sizes listed in an approximate-expression table to select an approximate expression for providing a target data size. A compression-rate determining unit 3 calculates a Q factor (X) for providing the target size of the compressed image data. A memory unit 4 and the recording medium 5 are identical to a memory unit 54 and the recording medium 55 of a conventional apparatus shown in FIG. 5, respectively.

Figure 2:
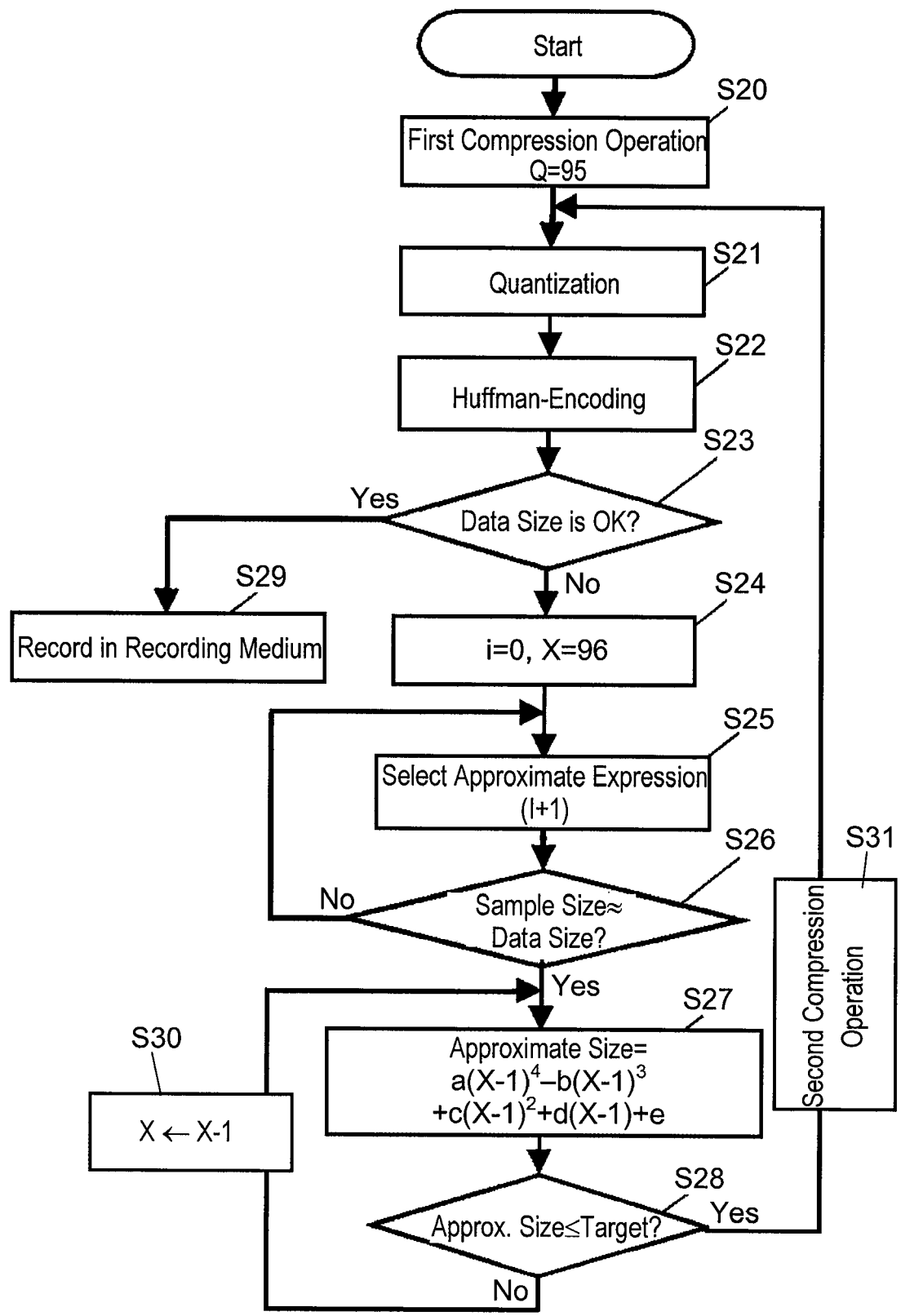
FIG. 2 is a flowchart of a routine of image data compression in the image data compressing apparatus according to the embodiment.

FIG. 2 is a flowchart of a routine of an image data compressing operation of the image data compressing apparatus of the embodiment. As a first compressing operation, image data stored in the first memory 4A is compressed at a fixed Q factor (compression rate), e.g. "95", (Step S20). Compressed image data is then quantized (Step S21) and is subjected to Huffman-encoding (Step S22). If the data size of the compressed image data is substantially equal to the target size, the data is stored in the recording medium (Step S29). If the data size of the compressed image data is not equal to the target size, a variable (i) is set to zero, and the Q factor (X) is set to "96" (Step S24). An approximate expression corresponding to a variable (i+1) is selected from the approximate-expression table (Step S25). It is then examined whether or not a sample data size selected from the approximate-expression table is substantially equal to the data size of the compressed image (Step S26). If the sample data size is not equal to the data size of the compressed image, the variable (i) is incremented by one, and the operation of Step S25 is repeated. In FIG. 2, the approximate expression is searched from a expression corresponding to the smallest data size, and, however, may be searched from a expression corresponding to the largest data size. An approximate expression corresponding to the largest sample data size in sample data sizes not exceeding the target data size may be selected. When the sample data size is substantially equal to the data size of the compressed image, an approximate data size corresponding to a Q factor (X−1) is calculated from the expression (Step S27). It is then examined whether or not the approximate data size is not greater than the target size (Step S28). If the approximate data size is not greater than the target size, the operation of Step S21 is executed under the Q factor (X−1). If the approximate data size is greater than the target size, the factor (X) is decreased by one (Step S30), and the operation of Step S27 is repeated.

The operation of the image data compressing apparatus and a method of compressing image data will be described in more detail.

The first data compression operation at a first compression rate (Q=95) will be described. Image data of an image provided by capturing the image with a camera or received from a video apparatus is stored in the first memory 4A of the memory unit 4. The image compressor 1 compresses the image data at the compression rate, the Q factor fixed to e.g. "95" by (Step S20 in FIG. 2). In the compressing operation, the compressor quantizes the data and subject the data to a Huffman encoding (Steps S20 to S22 in FIG. 2).

The image compressor 1 compares a data size of the compressed image data with a target size (Step S23 in FIG. 2). If the data size of the compressed image ranges within a predetermined range, e.g. ±20% of the target size, the compressor stores the compressed image data in the recording medium 5 (Step S29 in FIG. 2).

If the data size of the compressed image produced at Step S23 does not range within ±20% of the target size, the approximate-expression selector 2 compares the data size of the compressed image with each of the sample data sizes in the approximate-expression table and selects a approximate expression corresponding to a sample data size nearest the target data size. FIG. 4 illustrates the approximation table. The table includes sample data sizes corresponding to the variables (i+1). The sample sizes is approximate sizes at the Q factor (X) of "95". As shown in FIG. 4, constants (a to e) are coefficients of a quartic polynominal $(aX^4-bX^3+cX^2+dX+e)$ as the approximate expression.

Figure 3:
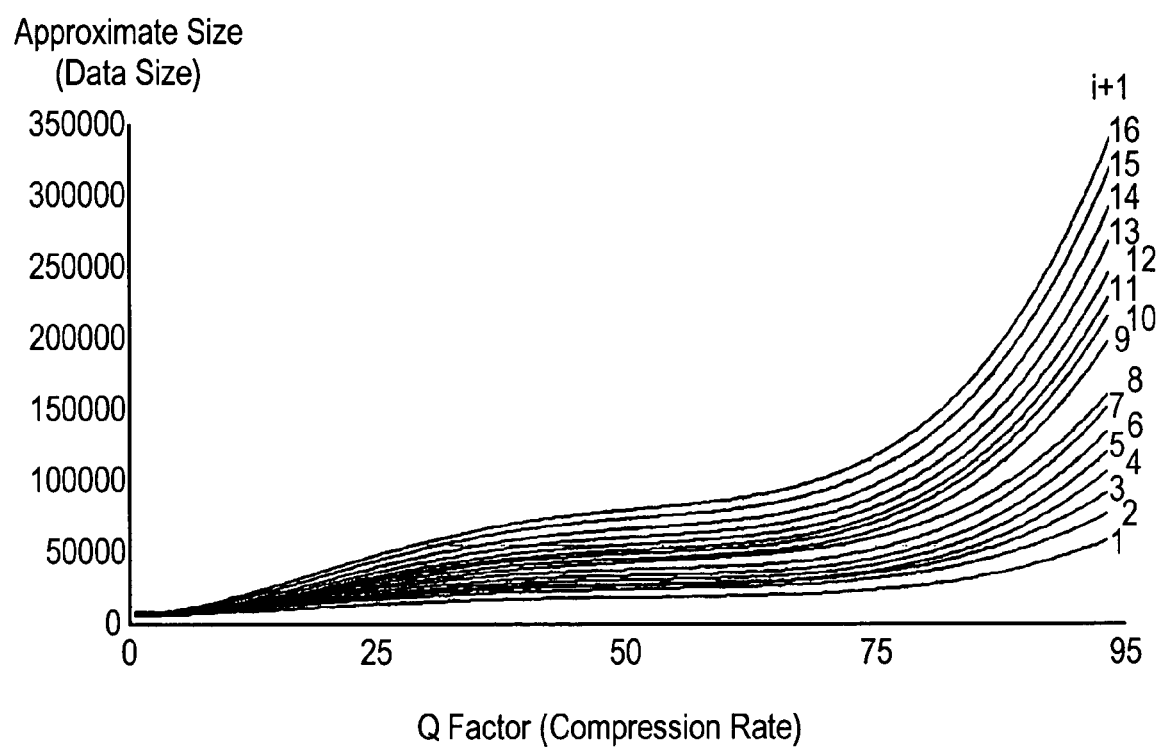
FIG. 3 shows approximate data size of an compressed image corresponding to a Q factor in the image data compressing apparatus according to the embodiment.

FIG. 3 illustrates plural curves of the data sizes corresponding to the Q factor ranging from 1 to 95. The constants (a to e) in the approximate-expression table are determined from the curves. The curves represent data sizes of compressed image data of images having various patterns. The approximate-expression table contains the constants for the approximate expression of the quartic polynomial which are determined from each of the curves. For calculation with a microprocessor, the constants may preferably be integers produced by multiplication by a certain number. The approximate data size is obtained by dividing the calculated approximate size by the certain number.

The approximate-expression table is used as follows. If data size of a compressed image data produced by compression at the Q factor of "95" is 150,000 Bytes, the approximate-expression selector 2 selects a sample data size of 145,435 Bytes, which is nearest the data size of the compressed data and located at the eighth row (i+1=8) from the top in the table shown in FIG. 4 (Steps S25 and S26 in FIG. 2).

If the target size is 40,000 Bytes, the compression-rate determining unit 3 repeats calculating approximate sizes at the Q factor decreased by one (X−1) from X=94 with using the approximate-expression at the constants (a=27, b=2769, c=40748, d=832, and e=6543) corresponding to the sample data size of 145,435 Bytes until the approximate data size becomes not greater than 40,000 (Steps S27 and S28 in FIG. 2).

The second data compressing operation will be explained. After the above steps, the Q factor of "50" is determined when the approximate data size is not greater than 40,000 Bytes. The image-data compressor 1 compresses the image data stored in the first memory 4A at the Q factor of "50" (Step S31 in FIG. 2). Since the data size of the compressed image ranges within ±20% of the target size, 40,000 Bytes, (Step S23 in FIG. 2), the image data compressor 1 stores the compressed data in the recording medium 55 (Step S29).

In order to modifying the data size of the compressed image data, it is generally known that a quantization table used for the guantization at Step 21 in FIG. 2 may be multiplied by the Q factor. The quantization table may be multiplied by a value obtained by multiplying the determined Q factor by a predetermined value. The quantization table is initialized to a default one at every data compressing operation.

According to this embodiment, the approximate data size is compared with the target data size. In the case that the image data includes extra data, such as a thumb nail, a tentative target data size may be provided by subtracting the extra data from the target data size, and be subjected to the above described operations. This operation has the compressed data size within the target data size.

According to this embodiment, the Q factor is initially set to a large value for the first data compressing operation for making the data size of the compressed image data greater than the target data size. For reducing a time for the data compressing operation, the initial setting of the Q factor may be decreased so that the data size of the compressed image data is much smaller than the target data size. In this case, the sample data sizes in the approximate-expression table are thus determined depending on the smaller setting of the Q factor. The approximate-expression selector 2 may have two of approximate-expression tables corresponding to the great and small settings of the Q factor. Approximate data sizes calculated with a selected approximate expression need to include an approximate data size not greater than the target size.

According to the embodiment, the approximate data size is calculated through decreasing the Q factor by one at one time at Steps S27 and S28 in FIG. 2. The approximate-expression selector 2 may set the Q factor first to "94" and then set the factor to "46". If the data size of the compressed image data is greater than the target data size, the selector 2 may decrease the factor to a half of "46", i.e., to "23". Then, if the data size of the compressed image data become smaller than the target size, the elector 2 increases the Q factor to "69", that is the selector 2 may determine a range of the Q factor by steps.

According to the embodiment, the approximate expression is the quartic polynomial, however, is not limited to it. The expression may be a polynomial of another degree, a logarithmic function, or an exponential function. While the approximate-expression table according to the embodiment stores the sample data sizes and the constants in the approximate expression, the table may store approximate expressions themselves corresponding to sample data sizes.

According to the embodiment, the approximate-expression table stores sixteen approximate expressions, and, however, may store another number of approximate expressions.

The apparatus and the method for compressing image data according to the embodiment may be implemented by either a hardware or a software. The software allows a computer having a recording medium recording the software to implement the image data compressing apparatus.

The image data compressor 1 may compress only a portion of image data temporarily stored in the first memory at the first compression rate. In this case, a data size of the compressed data of the entire image may be calculated from a ratio of areas. This reduces a time for determining the second compression rate. The image data compressor 1 may compress plural portions of image data temporarily stored in the first memory at the first compression rate.

The first compression rate may be determined so that the data size of the compressed image is either greater or smaller than the target data size.

As set forth above, in the apparatus and the method for compressing image data according to the embodiment, the approximate-expression table stores the coefficients for determining approximate expressions for calculating data sizes of compressed image data of images having various patterns, thus providing the compression rate such that the data size of the compressed data is smaller than a target data size. Therefore, the data size of the compressed image data is accurately smaller than the target size by maximum two steps of compressing operations.

What is claimed is:

1. An image data compressing apparatus comprising:
    an image data compressor for compressing image data input thereto at first and second compression rates to produce first and second compressed data, respectively;
    an approximate-expression table including a plurality of different predetermined sample data sizes and a plurality of predetermined approximate expressions which correspond to said plurality of different predetermined sample data sizes, respectively;
    an approximate-expression selector for selecting an approximate expression from said plurality of predetermined approximate expressions, said selected approximate expression corresponding to a first sample data size nearest a data size of said first compressed data among said plurality of different predetermined sample data sizes, each of said plurality of predetermined approximate expressions indicating a change of a data size in response to a compression rate; and
    a compression rate determining unit for determining said second compression rate by (1) changing a compression rate of said selected approximate expression, (2) calculating a second sample data size with the changed compression rate and (3) determining the second compression rate to be the rate corresponding to the calculated second sample data size within a predetermined threshold range of a target data size.

2. The image data compressing apparatus according to claim 1, wherein each of said plurality of predetermined approximate expressions is a polynomial.

3. The image data compressing apparatus according to claim 2, wherein said approximate-expression table includes coefficients of said polynomial.

4. The image data compressing apparatus according to claim 1, wherein at least one of said plurality of different predetermined sample data sizes is not greater than the target data size.

5. The image data compressing apparatus according to claim 1, further comprising
    a memory for storing said input image data,
    wherein said image data compressor compresses a portion of said image data stored in said memory at said first compression rate to produce said first compressed data.

6. The image data compressing apparatus according to claim 5, wherein said portion of said image data stored in said memory comprises a plurality of portions of said image data.

7. The image data compressing apparatus according to claim 1, wherein said plurality of predetermined approximate expressions are non-linear approximate expressions.

8. The image data compressing apparatus according to claim 7, wherein each of said plurality of predetermined approximate expressions is one of a quartic polynomial, a logarithmic polynomial or an exponential polynomial function.

9. A method of compressing image data, comprising:

receiving image data to be compressed; and using a processor to perform the steps of:

compressing the received image data at a first compression rate to produce compressed data;

providing a plurality of different predetermined sample data sizes and predetermined approximate expressions which correspond to said plurality of predetermined different sample data sizes, respectively;

determining a first sample data size from said plurality of different predetermined sample data sizes which is nearest a data size of the compressed data;

selecting a first approximate expression from said plurality of predetermined approximate expressions which corresponds to said first sample data size;

changing a compression rate of said first approximate expression;

calculating a second sample data size with the changed compression rate;

determining a second compression rate to be the rate corresponding to the calculated second sample data size within a predetermined threshold range of a target data size; and compressing the image data at the second compression rate.

10. The method according to claim 9, wherein each of the plurality of predetermined approximate expressions is a polynomial.

11. The method according to claim 9, wherein at least one of the plurality of different predetermined sample data sizes is not greater than the target data size.

12. The method according to claim 11, wherein said step of compressing the image data includes the sub step of compressing a portion of the image data at the first compression rate.

13. The method according to claim 12, wherein the portion of the image data includes a plurality of portions of the image data.

14. The method of compressing image data according to claim 9, wherein said plurality of predetermined approximate expressions are non-linear approximate expressions.

15. The method of compressing image data according to claim 14, wherein each of said plurality of predetermined approximate expressions is one of a quartic polynomial, a logarithmic polynomial or an exponential polynomial function.

* * * * *

UNITED STATES PATENT AND TRADEMARK OFFICE
CERTIFICATE OF CORRECTION

| | |
|---|---|
| PATENT NO. | : 7,542,616 B2 |
| APPLICATION NO. | : 10/721389 |
| DATED | : June 2, 2009 |
| INVENTOR(S) | : Masahiko Hatanaka et al. |

It is certified that error appears in the above-identified patent and that said Letters Patent is hereby corrected as shown below:

Title Page; item (56);

At FOREIGN PATENT DOCUMENTS, please delete "JP 10-066004 A 3/1998".

Signed and Sealed this

First Day of December, 2009

David J. Kappos
*Director of the United States Patent and Trademark Office*